March 6, 1956
S. C. COLLINS
2,737,022
EXPANSION VALVE
Filed Oct. 1, 1951
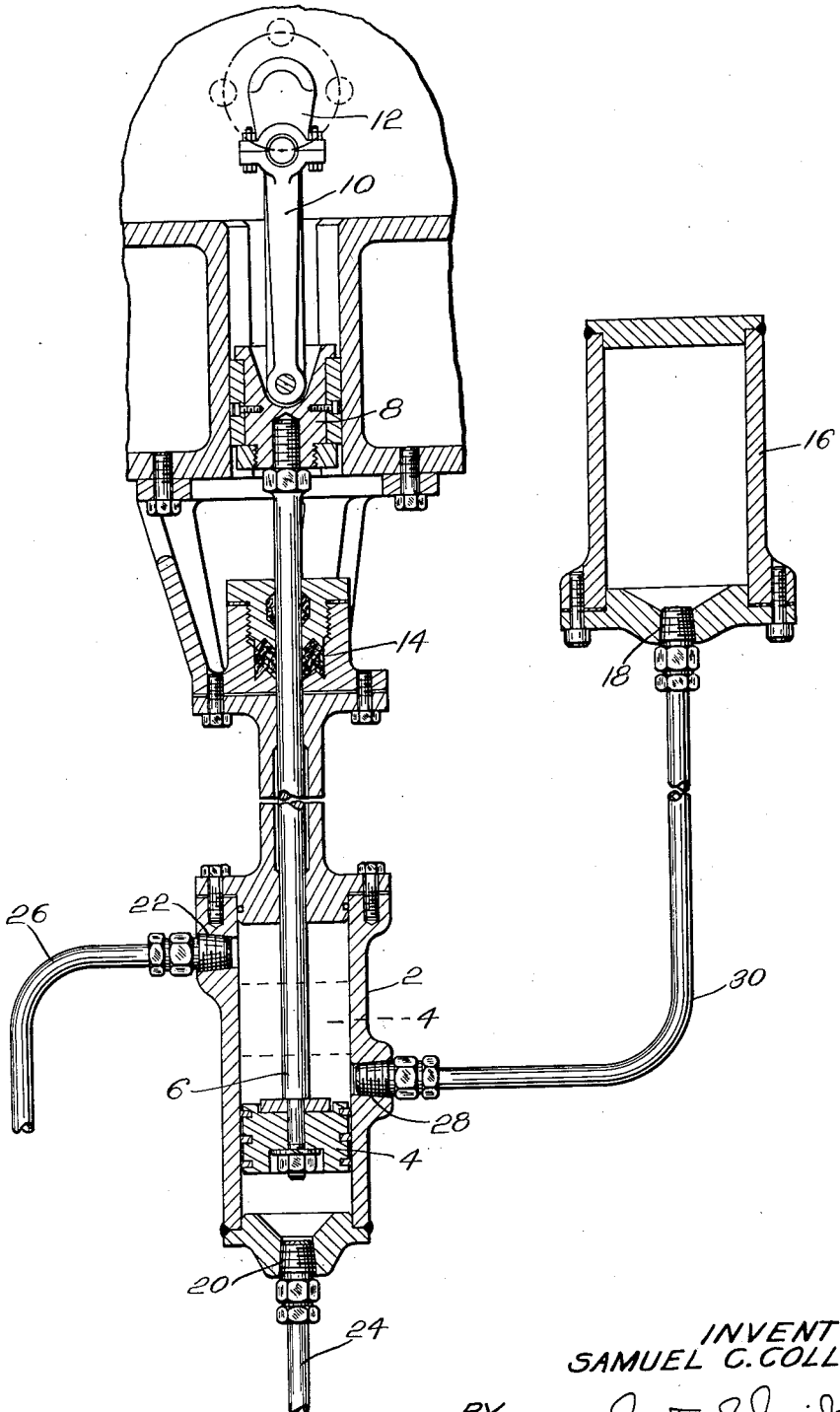
INVENTOR:
SAMUEL C. COLLINS
BY John F. Schmidt
ATTORNEY

United States Patent Office 2,737,022
Patented Mar. 6, 1956

2,737,022
EXPANSION VALVE

Samuel C. Collins, Watertown, Mass., assignor to Joy Manufacturing Company, Pittsburgh, Pa., a corporation of Pennsylvania Application October 1, 1951, Serial No. 249,117

6 Claims. (Cl. 62—1)

This invention relates to an expansion valve, particularly to an expansion valve which must pass a fluid consisting of mixed vapor and liquid from a high pressure to a lower pressure, and is particularly adapted to use or application in an air rectification system.

Apparatus for the separation of gases such as air conventionally separate the gases at low temperature, using a rectification column. It is customary in these systems to pass a fluid consisting of mixed vapor and liquid from a high pressure to a low pressure. Such a system is shown in my patent application Ser. No. 236,014, filed July 10, 1951, and assigned to the assignee of this invention.

In the transfer, as described in my above-identified patent application, of fluid from a high pressure to a lower pressure, there is often a substantial loss of vapor through the expansion valve. This loss of vapor represents a thermo-dynamic loss in the system as a whole, and should be kept to a minimum. It is accordingly an object of this invention to provide an expansion valve which reduces the vapor loss through the valve to an absolute minimum, but which otherwise carries out the normal functions of an expansion valve. This and other objects are accomplished in an expansion valve comprising an expansible chamber device and another chamber which is an enclosed chamber having a conduit connected to an opening through its bottom. The expansible chamber device has a high pressure connection and a low pressure connection and includes a piston. The device also has a connection with the second chamber, and the piston moves in the expansible chamber device, connecting the high pressure connection and the low pressure connection alternately with the second chamber referred to.

The sole figure of the drawing shows a view in section through an expansion valve made according to this invention.

The expansible chamber device referred to above is shown as a piston and cylinder mechanism, consisting of a cylinder 2 and a suitably packed piston 4 reciprocable in the cylinder. Piston 4 is connected to a piston rod 6 in any suitable manner as will be understood by those skilled in the art, and the piston rod 6 is in turn connected to a crosshead 8 which may be any conventional suitable crosshead. A connecting rod 10 is connected at its one end to the crosshead 8 and at its other end to a crank 12. The crank 12 will be driven at any selected constant speed, by any suitable means such as an engine, electric motor, or the like. The rod 6 is packed, preferably at a point remote from the cylinder, by a suitable packing shown at 14.

A second chamber 16, which may for convenience be called a surge chamber, is provided and is a dead end pot or closed chamber, having a connection 18, preferably through the bottom.

The expansible chamber device comprising the cylinder 2 and piston 4 has a high pressure fluid connection at one end of the cylinder and a low pressure fluid connection at its other end; thus, the drawing shows a high pressure fluid connection 20 at or adjacent the lower end and a low pressure fluid connection 22 at or adjacent the upper end of the cylinder. The connection 20 is joined to a conduit 24, the conduit 24 comprising that portion of the conduit 84 of Fig. 1 of my above-identified patent application which is upstream of valve 86; the valve 86 shown schematically therein could if desired be the expansion valve of this application. The downstream side of the conduit 84 shown in Fig. 1 will be the conduit 26 connected to the low pressure connection 22. A third connection 28 is provided, preferably substantially midway between the ends of the cylinder 2. The connection 28 has connected thereto a conduit 30 which is joined to the connection 18 of the surge chamber 16.

Operation

As the crank 12 rotates about its axis, piston 4 moves between the position shown in full lines in the drawing and the position shown in dotted lines in the drawing, at a preselected constant speed. When piston 4 is in the dotted line position, the connection 20 communicates through cylinder 2 with the connection 28, which puts the high pressure conduit 24 in direct communication with the surge chamber 16. As a consequence of this connection, the surge chamber 16 fills with a mixture of vapor and liquid, the mixture being largely liquid. It will of course be understood by those skilled in the art that the vapor will collect at the upper end of the surge chamber 16.

With the piston in the solid line position shown in the drawing, the low pressure connection 22 communicates through the cylinder 2 with the connection 28, which means that the low pressure conduit 26 is in direct communication with the surge chamber 16 through the cylinder 2. While the piston thus provides the communication indicated, the pressure in chamber 16 is sufficient to force all of the liquid out of chamber 16 by way of connection 18, conduit 30, connection 28, cylinder 2, connection 22 and conduit 26, to the upper end of the column.

It will of course be understood by those skilled in the art that the device must be operated in such a manner that all of the liquid transferred to surge chamber 16 is allowed to discharge therefrom. In order to make sure that all of the liquid is thus discharged, the expansion valve must of course be allowed to pass a small quantity of vapor. The speed of crank 12 will be so adjusted as to pass the liquid as fast as it is formed in the boiler-condenser of a single column, allowing no liquid to accumulate in the coil; in the operation of a double-column system, the speed of crank 12 will be similarly determined for each of two valves, because two fluids are conventionally expanded in a double-column. Thus, in a double-column system, an expansion valve according to this invention may, and preferably will, be used to transfer nitrogen-rich liquid as well as oxygen-rich liquid to the upper or low-pressure section of the column. More specifically, in the embodiment shown in Fig. 3 of my application Ser. No. 236,014 referred to above, valves 162 and 174 will be made according to this invention.

It will be apparent from the foregoing that I have here provided an expansion valve which will pass all of the liquid of a mixed liquid and vapor fluid, and a minimum of the vapor, thus reducing thermodynamic losses in the system to a minimum. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

2,737,022

I claim:

1. An expansion valve comprising a surge chamber, an expansible chamber device having a high pressure fluid connection and a low pressure fluid connection, conduit means connecting the surge chamber with said device at a point intermediate said high and low pressure connections, the expansible chamber device having means movable through a timed repeating cycle alternately to connect the high and low pressure fluid connections with the surge chamber through the conduit means, and timing means to move said movable means through said cycle a given number of cycles per unit of time.

2. An expansion valve comprising a surge chamber having a fluid connection in its bottom, an expansible chamber device having a high pressure fluid connection and a low pressure fluid connection, conduit means connecting said device at a point intermediate said high and low pressure connections with the surge chamber fluid connection, the expansible chamber device having timed means movable alternately to connect the high and low pressure fluid connections with the surge chamber through the conduit means, and timing means to move said movable means.

3. An expansion valve comprising a cylinder, a high pressure connection to the cylinder interior, a low pressure connection to the cylinder interior, a third connection to the cylinder interior intermediate said high and low pressure connections, a surge chamber, means connecting the third connection with the surge chamber, a piston reciprocable through a timed repeating cycle in the cylinder and having one operating position in which the high pressure connection communicates with the third connection through the cylinder and another operating position in which the low pressure connection communicates with the third connection through the cylinder, and timing means to move the piston back and forth between said operating positions through said cycle a given number of cycles per unit of time.

4. An expansion valve comprising a cylinder, a high pressure connection to one end of the cylinder, a low pressure connection to the other end of the cylinder, a third connection to the cylinder substantially midway between said ends, a surge chamber, means connecting the surge chamber with the third connection, a piston reciprocable through a timed repeating cycle in the cylinder and having one operating position between the high pressure connection and the third connection and another operating position between the low pressure connection and the third connection, and timing means to reciprocate the piston from one position to the other through said cycle a given number of cycles per unit of time.

5. A cylinder, a piston reciprocable in said cylinder, a connection with said cylinder intermediate its ends at a position such that said piston may be disposed in said cylinder wholly at either side of said connection, a surge chamber connected with said connection, high and low pressure connections to said cylinder at opposite sides of said first connection and alternatively connectible with said first connection when said piston is in positions wholly to one side of said connection and wholly to the other side of said connection and timing means to reciprocate the piston from one position to the other a given number of cycles per unit of time.

6. An expansion valve comprising a chamber forming element having three connections with the chamber thereof, a surge chamber, a conduit connecting said surge chamber with one of said connections, another of said connections being a high pressure connection and a third a low pressure connection, means in said chamber movable to positions in which it alternatively establishes connection between the high pressure connection and the surge chamber and between the low pressure connection and the surge chamber, said means precluding in its transition between said positions direct communication between said high and said low pressure connections, and timing means for shifting said connection establishing means from one of said positions to the other a given number of cycles per unit of time.

References Cited in the file of this patent

UNITED STATES PATENTS

| 1,321,230 | Miles | Nov. 11, 1919 |
| 1,808,117 | McLellan | June 2, 1931 |
| 2,482,569 | Zearfoss | Sept. 20, 1949 |
| 2,518,212 | Wilson | Aug. 8, 1950 |